United States Patent [19]

Kraus

[11] 4,052,915

[45] Oct. 11, 1977

[54] TRACTION ROLLER TRANSMISSION

[75] Inventor: Charles E. Kraus, Austin, Tex.

[73] Assignee: Excelermatic, Inc., Leesburg, Va.

[21] Appl. No.: 704,438

[22] Filed: July 12, 1976

[51] Int. Cl.² .................. F16H 13/06; F16H 13/10; F16H 13/14
[52] U.S. Cl. ...................... 74/798; 74/206; 74/209
[58] Field of Search ............ 74/206, 208, 209, 798

[56] References Cited

U.S. PATENT DOCUMENTS

| 747,016 | 12/1903 | Sundh et al. | 74/798 |
| 1,737,295 | 11/1929 | Bronander | 74/206 |
| 1,782,756 | 11/1930 | Edmunds et al. | 74/798 |
| 1,811,921 | 6/1931 | Edmunds | 74/798 |
| 1,993,051 | 3/1935 | Dell et al. | 74/206 |
| 3,013,439 | 12/1961 | Voci | 74/209 |
| 3,375,739 | 4/1968 | Nasvytis | 74/798 |
| 3,433,099 | 3/1969 | Nasvytis | 74/208 |
| 3,475,993 | 11/1969 | Hewko | 74/208 |
| 3,793,907 | 2/1974 | Nakamura | 74/798 |
| 3,941,004 | 3/1976 | Kraus | 74/206 |

FOREIGN PATENT DOCUMENTS

| 1,201,480 | 2/1967 | United Kingdom | 74/798 |

Primary Examiner—Samuel Scott
Assistant Examiner—Allan R. Burke

[57] ABSTRACT

A traction roller transmission having a number of traction rollers disposed in an annular space formed between a sun roller rotatable with one shaft and traction rings surrounding the sun roller. The traction rollers are rotatably supported and mounted for movement with another shaft and the traction rings are slightly conical and held in position by cam structures such that a torque transmitted through the transmission forces the conical traction rings toward each other so as to cause firm engagement of the traction rollers with the traction rings and the sun roller. Springs are disposed between the traction rings to provide for return of the traction rings when the torque transmitted through the transmission is reduced.

6 Claims, 2 Drawing Figures

TRACTION ROLLER TRANSMISSION

BACKGROUND OF THE INVENTION

1. Field of the Invention

The invention relates to fixed-ratio traction roller transmissions in which the contact forces applied to the traction surfaces which are in engagement with each other for the transmission of movement are dependent on the torque transmitted through the transmission.

2. Description of the Prior Art

Traction roller transmissions in which large contact forces are applied to prevent slippage of the rollers are described for example by Harold A. Rothbart in "Mechanical Design And Systems" Handbook pages 14-8 and 14-9, McGraw-Hill, New York 1964. In the relatively simple arrangements of FIGS. 14.6 and 14.7 wherein the outer rings are slightly undersized to compress the roller arrangements the surface pressure on the traction surfaces is always the same that is, it is always high independently of the torque transmitted through the transmission. Various transmission arrangements are also known in which the contact pressure of the traction surfaces is dependent on the size of the torque transmitted through the transmission for example as in those shown on page 14-8 of said handbook. Other transmissions of this type are shown in U.S. Pat. Nos. 771,541; 1,212,462; 1,704,205; 1,956,934, 3,610,060 and Swedish Patent No. 281,542.

In U.S. Pat. No. 771,541 the variable compressive forces are obtained by an outer ring structure so arranged that the ring is compressed when a torque is transmitted through the transmission. However, the arrangement requires sliding surface areas which are difficult to manufacture or complicated lever arrangements which amplify the reaction forces of the transmission to provide sufficient compression of the outer ring for its engagement with the traction rollers. Furthermore, there is a discontinuity in the outer ring structure which, with the large forces taken up by the ring structure, may well lead to premature failures.

U.S. Pat. No. 3,610,060 shows a friction drive in which the sun roller consists of two conical sections adapted to be forced toward each other when a torque is transmitted through the drive in order to provide firm engagement of the planetary rollers with the sun roller and the traction ring surrounding the traction rollers. However, the differences in diameter between the smallest diameter section of the sun roller and its largest diameter is relatively large so that substantial spin takes place which results in wear and friction losses. On the other hand, this transmission requires a relatively large cone angle of the conical sun roller sections in order to avoid their locking and it requires relatively long lines of contact between the sun roller sections and the planetary rollers in order to avoid overly large surface pressures which are very localized as a result of the large curvature difference between the sun roller and planetary roller traction surfaces.

SUMMARY OF THE INVENTION

In a traction roller transmission having coaxial input and output shafts a sun roller is supported by one of the shafts and traction rollers having cylindrical central sections and conical outer sections are disposed around the sun roller and supported for rotation with the other shaft. A traction ring structure including conical traction rings surrounds, and is in contact with, the conical section of the traction rollers while the cylindrical sections of the traction rollers are in contact with the sun roller. Means are provided for forcing the traction rings toward each other and into firm engagement with the conical sections of the traction rollers and the cylindrical sections of the traction rollers into firm engagement with the sun roller.

The cone angle of the conical outer sections of the traction roller and of the traction rings is relatively small so that hardly any spin occurs in the contact areas of the traction rollers with the traction rings and separating means are arranged between the traction rings for axially forcing the traction rings apart for disengagement thereof from the traction rollers.

DESCRIPTION OF THE PREFERRED EMBODIMENT

Figure 1:
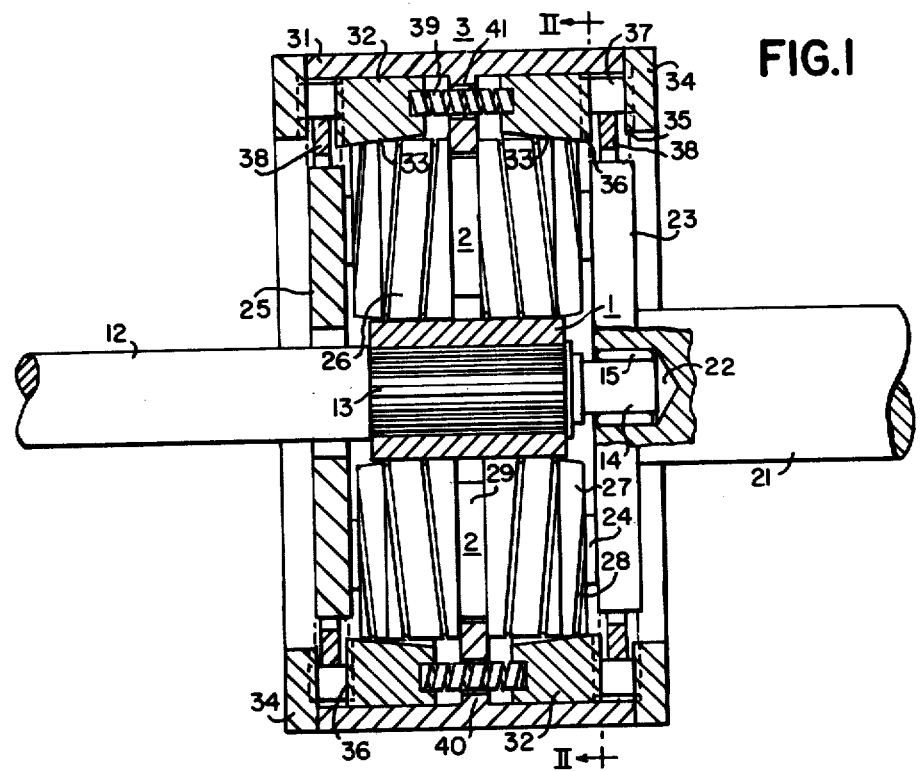
FIG. 1 is a cross-sectional view of a traction roller transmission including a helical spring which forces the transmission parts into engagement with each other.
Figure 2:
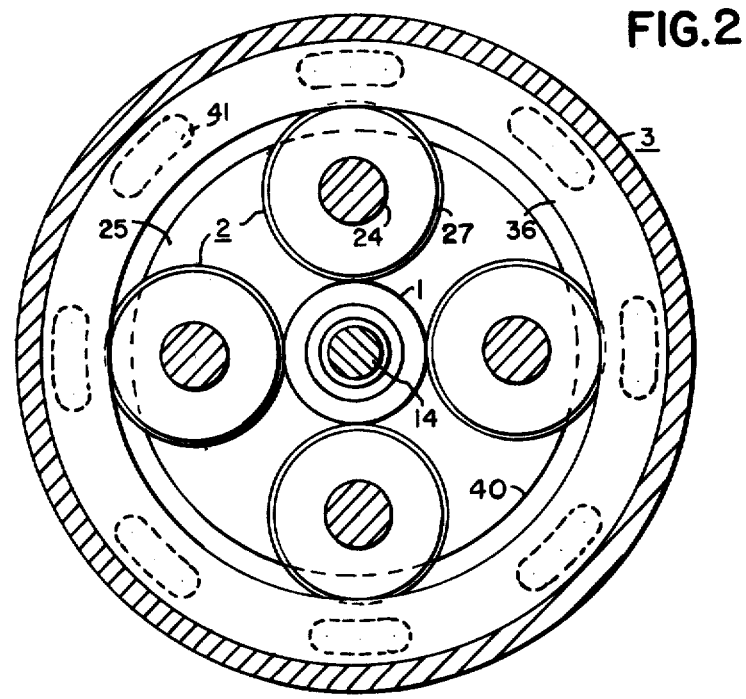
FIG. 2 is a cross-sectional view taken along line II—II of FIG. 1.

FIGS. 1 and 2 show a traction roller transmission including basically a sun roller 1 centrally disposed within a traction ring assembly 3 and traction rollers 2 arranged in the annular path between the sun roller 1 and the traction ring assembly 3.

The sun roller 1 is mounted on an input shaft 12 for rotation therewith for example by splines 13. The input shaft 12 has a trunnion 14 extending into a bore 22 in an output shaft 21 and is supported therein by a bearing 15. The output shaft 21 has a flange 23 which carries studs 24 on which the traction rollers 2 are supported. The traction rollers 2 are supported on the studs 24 preferably by roller bearings disposed within the traction rollers 2 and not shown in the drawings. The studs 24 extend through the traction rollers 2 and are, at the other end, interconnected by a support ring 25 for greater stability.

The traction rollers 2 have cylindrical sections 26 which are in frictional engagement with the sun roller 1 and, at their axially outer ends, slightly tapered sections 27 which are preferably conic and which are in frictional engagement with the traction ring assembly 3. The traction rollers 2 have also helical grooves 28 formed in their circumferential surfaces which break the lines of frictional engagement and which can accept lubricant adhering to the traction surfaces.

The traction ring assembly 3 consists of a housing ring 31 which carries two traction rings 32 having slightly tapered or conical inner traction surfaces 33 corresponding to, and for engagement with, the conical sections 27 of the traction rollers 2. Cam rings 34 are mounted at the axially opposite ends of the housing ring 31. The opposite surfaces of the cam rings 34 and the traction rings 32 are provided with cam surfaces 35 and 36 and rollers 37 are held in the space between the cam surfaces by lock rings 38 so that relative rotational movement between the traction rings 32 and the housing ring 31 with its cam rings 34 forces the traction rings 32 toward each other and into firm engagement with the traction rollers 2.

The cone angle provided on the traction rings 32 and on sections 27 of the rollers 2 is relatively small that is, normally less than 6° in order to avoid spin and the wear associated therewith. Such small angles however may cause locking of the traction rings 32 with the rollers 2. Therefore, springs 39 are arranged between the traction rings 32, and the housing ring 31 is provided with a flange 40 extending into central grooves 29 formed in the traction rollers 2 to hold the traction rollers in place when the traction rings 32 are returned to their spaced positions that is when the torque transmitted through the transmission is reduced. The springs 39 extend through openings 41 in flange 40 which openings are elongated so as to permit the relative movement between the traction rings 32 and the housing ring 31 that causes the engagement of the traction rollers 2 with both the sun roller 1 and the traction rings 32. There is normally sufficient play in bearings so that, with close tolerances in manufacture, the compressive forces of the traction rings are transmitted through the traction rollers to the sun roller and are not taken up by the traction roller bearings. But it is also possible to mount the traction roller bearings in sleeves which have eccentric bearing support openings and which are rotatably supported in the traction rollers so as to permit — within limits — free radial movement of the traction rollers. In another solution the traction rollers may simply be held in a cage such as a roller bearing cage which cage is connected to the flange 23 and has for each traction roller a radial gap that permits slight radial movement of the traction rollers The area or the length of the lines of contact of the traction rollers 2 with the sun roller 1 is substantially larger than their lines of contact with the traction rings because the curvature difference between the sun roller and the traction roller is substantially larger than the curvature difference between the traction rings and the traction rollers. Furthermore, the sun roller 1 is in contact with the traction rollers 2 only along the cylindrical central section of the traction rollers 2 while the traction rings 32 are in contact with the traction rollers 2 only along their conical outer sections 27 so that even the small amount of spin resulting from the frictional engagement along the conical surfaces is limited to those areas where conical surfaces are needed and where the lines of contact can be short and where the spin does not affect the areas of contact between the sun roller 1 and the traction rollers 2. For a full understanding of the reason why the lines of contact between the traction rings and traction rollers can and should be shorter reference is made to the present inventors U.S. Pat. No. 3,848,476.

The invention is, of course, not limited to the arrangement shown in the drawings and described herein. The housing ring could for example be part of a transmission housing in which the input and output shafts are supported, or the traction rollers could be mounted stationarily that is rotatably only about their support studs which support studs would then be supported by the transmission housing while the output shaft is connected to the housing ring which carries the traction rings. It is further possible that both, the traction rollers and the traction ring are connected to output shafts of which one may selectively be held in position.

I claim:

1. In a traction roller transmission comprising: a traction ring structure including two traction rings having opposite conical inner traction surfaces; a sun roller centrally disposed within the traction ring structure and having a circumferential traction surface spaced from the traction surfaces of said traction rings; planetary traction rollers supported in the space between the sun roller and the traction ring structure, each of said traction rollers having a cylindrical central section in engagement with said sun roller and axially outer conical sections in engagement with the conical traction rings, and engagement means for forcing said traction rings toward each other and into firm compressive engagement with the traction rollers and said traction rollers into frictional engagement with said sun roller; the improvement residing in the cone angle of said conical traction ring surfaces and the conical surface sections of the traction rollers being relatively small so as to prevent substantial spin at the conical surfaces of the traction rollers and the traction rings and separating means being disposed between the traction rings for axially forcing said traction rings apart for disengagement of said traction rings from said traction rollers.

2. A transmission as recited in claim 1, wherein said traction ring structure includes a central flange and said traction rollers have central grooves receiving said central flange for axially holding the traction rollers and wherein said separating means are springs disposed between the traction rings and extending through openings formed in the central flange.

3. A transmission as recited in claim 1, wherein said means for forcing the traction rollers toward each other is a roller - and axial cam arrangement.

4. A traction roller transmission as recited in claim 1, wherein the cone angle of the conical sections of the traction rollers and the cone angle of the traction ring surfaces is about 6°.

5. A transmission as recited in claim 1, wherein the combined axial length of the conical sections is substantially smaller than the axial length of the cylindrical sections of the traction rollers.

6. A transmission as recited in claim 1, wherein the traction rollers are rotatably mounted on a flange connected to one of an input and output shaft and the sun roller is mounted on the other shaft and so closely engaged by the traction rollers as to be rotatably supported therebetween, said other shaft having a stud extending into a bore formed in the one shaft and being rotatably supported therein.

* * * * *